— # 2,730,517

MODIFICATION OF POLYESTER BODIES

Henry A. Vogel and Alfred R. Bader, Milwaukee, Wis., assignors to Pittsburgh Plate Glass Company No Drawing. Application January 15, 1952, Serial No. 266,598

10 Claims. (Cl. 260—75)

The present invention relates to polyesters and it has particular relation to treatment of polyesters containing free hydroxyls in order to obtain esterification of the latter.

The invention comprises, as one feature, subjecting to appropriate conditions a mixture of an alkyd type polyester containing free hydroxyls and an ester of a beta-keto acid such as aceto-acetic acid and a lower monohydric alcohol, whereby to effect ester interchange between the initial beta-keto ester and the polyester, thus introducing into the polyester molecules reactive groups of the formula:

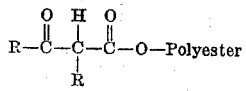

where R may be alkyl or aryl groups. These groups contain reactive hydrogen atoms, reactive carbonyl groups and by tautomerism provide enolic hydroxyls and thus lend themselves to ready subsequent reactions and modifications which will be more fully discussed hereinafter.

It has heretofore been recognized that it is difficult to prepare an alkyd resin in which complete esterification has taken place. In most commercial alkyds, a slight excess of the polyhydric alcohol such as glycerol, is employed in order to bring the acid value to a minimum. In consequence, unesterified hydroxyl groups remain in the resultant alkyd body and to these, the poor water resistance of the alkyds is often ascribed.

In accordance with the provisions of the present invention, the foregoing free hydroxyls or at least a portion thereof are caused to undergo ester interchange with a beta-keto ester of a lower alcohol such as methyl aceto-acetate. As a result of the ester interchange reaction, free hydroxyls are eliminated. Likewise, as a result of the reaction, the active hydrogen atoms, active carbonyl groups and enolic hydroxyls above mentioned, are introduced into the alkyd molecules and these groups produce additional functionality, adapting the product to numerous other reactions some of which will be hereinafter discussed in greater detail.

Ester interchange reactions between various higher hydroxylated bodies and the esters of beta-keto acids and lower alcohols have been discussed in considerable detail in a commonly owned, copending application to Lowell O. Cummings, Henry A. Vogel and Alfred R. Bader, Serial No. 219,900, filed April 7, 1951. The reaction of the free hydroxyls of the alkyd resins and the beta-keto esters of lower alcohols by esterinterchange as herein disclosed, involves a similar reaction. Therefore, the disclosure of the prior application, insofar as it discloses conditions of ester interchange, is incorporated with and made a part of this application. For optimum efficiency of ester interchange reactions, the procedures as outlined in the application for effecting ester interchange between the alkyd body and the lower esters of beta-keto acids may be employed. However, in many instances, the high degree of efficiency obtainable by the techniques of the application may not be required and under such conditions various other techniques of reaction may be adopted.

The reaction of ester interchange is believed to proceed in accordance with the equation:

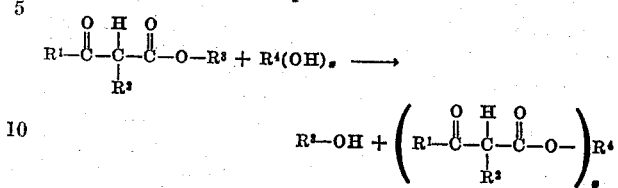

where $R^4$ is an alkyd resin body. The nature of $R^1$, $R^2$, and $R^3$, in the present case are governed by the polyester structure and will be apparent from subsequent descriptions.

Alkyd bodies containing group $R^4$, suitable for ester interchange reaction with lower esters of beta-keto acids in accordance with the provisions of the present invention, include substantially any of the recognized alkyd bodies which are of a reasonable degree of solubility and fusibility and which contain a reasonable number of free hydroxyls. Examples of such polyesters include glyceryl phthalates such as the simple polyester obtained by esterification of phthalic anhydride with an excess of glycerol above that theoretically required in order to obtain neutralization of the carboxyls of phthalic acid. The excess of hydroxyls will usually be in a range of 1 to 30% with respect to the total available carboxyls. Succinic acid, adipic acid, azelaic acid, carbic acid (or their anhydrides) and many other saturated acyclic dicarboxylic acids may be substituted for phthaleic acid in the preparation of polyesters suitable for the ester interchange reaction of the present invention.

It is of course, recognized that in many instances the polyester bodies as disclosed in the prior art, are modified with various fatty acids including stearic acid, palmitic acid, oleic acid, linoleic acid, linolenic acid, riconoleic acid and many others.

Likewise, it has been common practice in the art to modify the polyester bodies by the inclusion in varying amounts, of glycerol and glyceride oils such as linseed oil, soybean oil, castor oil, palm oil and many others. Since the preparation of simple alkyd bodies and modification of such bodies containing fatty acids introduced as free acids or through the introduction of the glycerides or partial glycerides of the acids, is a well recognized art which has been extensively publicized over a period of many years, it is not believed to be necessary to discuss in detail the preparation of the alkyd bodies such as those above referred to. These bodies can react by ester interchange with esters of lower alcohols and beta-keto acids.

It has also been recognized as common practice to prepare ethylenically unsaturated alkyd like bodies which are polyesters of an excess of a dihydric alcohol such as ethylene glycol, diethylene glycol, triethylene glycol, polyethylene glycol and propylene glycol with dicarboxylic acids containing functioning ethylenic groups and being typified by maleic acid (or its anhydride) fumaric acid, itaconic acid, methyl maleic acid, carbic acid and others. Polyesters which are obtained from ethylenically unsaturated dicarboxylic acids are recognized to be polymerizable by addition reaction between the ethylenic groups of contiguous molecules. Also, the polyesters are capable of copolymerization with compounds which are usually soluble in the polyester, usually are liquids and are of the formula:

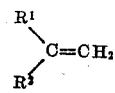

where at least one group, $R^1$ or $R^2$ is negative, e. g. phenyl, carboxyl ester, nitrile, chlorine or the like, and the other is of the same class or is hydrogen, hydrocarbon, e. g. methyl, ethyl, or the like. The active group in such compound is the terminal ethylenic >C=CH₂ or vinyl groups. The class of compounds is represented by styrene, alpha-methyl styrene, diallyl phthalate, diallyl succinate, allyl acetate, vinyl acetate, methyl methacrylate, methacrylic acid, vinyl chloride, vinylidene chloride, acrylonitrile and many other such compounds. The polymerizable polyesters and the copolymerization of such polyesters with ethylenically unsaturated monomers is discussed in such articles as those published in Industrial and Engineering Chemistry, volume 31, No. 12, page 1512, and volume 32, No. 1, page 64. This type of polyester, it will be recognized, may also be modified with the fatty acids of glyceride oils such as palmitic acid, ricinoleic acid, oleic acid, linoleic acid, linolenic acid and the like. The esters of the ethylenically unsaturated dicarboxylic acids either with or without modification with fatty acids may be employed in the practice of the present invention.

Various satisfactory polymerizable mixed polyesters containing free hydroxyls are also obtained from esterification of glycols and mixtures of ethylenically unsaturated dicarboxylic acids containing alpha-beta ethylenic unsaturation and a saturated dicarboxylic acid or a dicarboxylic acid which is free of polymerizing ethylenic groups. Dicarboxylic acids of this latter type include phthalic acid, succinic acid, adipic acid, azelaic acid and the like. In preparing the mixed polyesters, substantially any reasonable proportions of the two types of acid may be combined in a single polyester molecule. For example, the proportion of the saturated dicarboxylic acid may extend from .25 to 6 or 8 or even 10 moles with respect to the molar proportions of the ethylenically unsaturated dicarboxylic acid.

The mixed esters may also contain fatty acid components as above described.

The reaction of any of these alkyd or polyester bodies, where they are soluble and contain a reasonable number of free hydroxyls with beta-keto acid esters in accordance with this disclosure, is a feature of the present invention.

THE BETA-KETO ESTER COMPONENT

Beta-keto esters adapted to react by ester interchange with alkyds such as A to G (to follow) within the scope of the present invention, as previously indicate, include the group:

$$R^1-\overset{O}{\overset{\|}{C}}-\overset{H}{\overset{|}{\underset{R^2}{C}}}-\overset{O}{\overset{\|}{C}}-O-R^3$$

where R¹ is most commonly —CH₃ but may be other groups including:

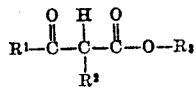

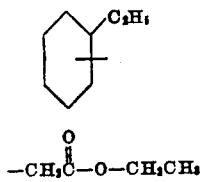

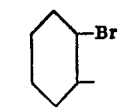

NH₂—

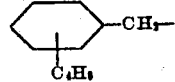

and others. R² most commonly is hydrogen but it can be hydrocarbon or substituted hydrocarbon such as methyl, ethyl, propyl or butyl, benzyl, phenyl or the like. It can also be amino and chloro. Only one of the hydrogens of the alpha carbon atom can be replaced. The remaining atom is active and is essential to the ester interchange reaction.

The group R³ is the replaceable group in the ester interchange reaction. It can be regarded as the residue of a lower aliphatic or olefinic alcohol.

Lower relatively volatile alcohols with which such beta-keto bodies are esterified to provide R³, include methyl alcohol, ethyl alcohol, propyl alcohol, isopropyl alcohol and butyl alcohol and such other saturated and monohydric alcohols as are reasonably volatile and can therefore be removed with adequate facility from the polyester undergoing ester interchange reaction.

The invention also includes unsaturated alcohols as the lower alcohol of the beta-keto ester. Such unsaturated alcohols include allyl alcohol, methallyl alcohol, crotyl alcohol, propargyl alcohol, butyl alcohol, substituted lower alcohols such as 2 chloroethyl alcohol, 2 fluoroethyl alcohol, 2 nitropropyl alcohol and others.

Specific examples of beta-keto acids with which these lower alcohols may be esterified include: acetoacetic acid, alpha ethyl acetoacetic acid, alphaisopropyl acetoacetic acid, alpha methyl acetoacetic acid, benzoyl acetoacetic acid, acetone dicarboxylic acid, gamma chloro acetoacetic acid, alpha benzoyl acetoacetic acid, alpha phenyl acetoacetic acid, chloro iodo and bromo substitution products of the above acids, acetylsuccinic acid, benzoylacetic acid, the diester of:

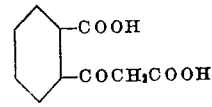

and others of like character.

THE ESTER INTERCHANGE REACTION BETWEEN THE ALKYD POLYESTER BODY AND THE LOWER ESTER OF A BETA-KETO ACID

The conditions of ester interchange reaction between a body containing free hydroxyls and a lower ester of beta-keto acid as herein disclosed has been elaborated upon and explained in considerable detail in the foregoing application, Serial No. 219,900. It is reiterated that the prior application is incorporated herein and the disclosure thereof insofar as it pertains to the ester interchange reaction, is to be regarded as constituting a part of the present application.

It may be stated that in general the alkyd body containing free hydroxyls in substantial amount and with or without an inert diluent, such as paraffinic naphtha, toluene, xylene or the like, is admixed with the beta-keto ester of a lower alcohol such as methyl aceto-acetate. Attainment of complete esterification of all free hydroxyls in the polyester is attained by employing a considerable excess of the beta-keto ester of a lower alcohol with respect to the total available hydroxyls of the alkyd body.

In the prior application, it is suggested to employ at least two moles of an ester of a lower alcohol and the beta-keto acid per mole of higher alcohol.

Alkyd resins are of uncertain molecular structure therefore it is not practicable to express a molecular ratio between the alkyd body and the ester of acetoacetic acid and the lower alcohol. Usually it is sufficient to add the beta-keto acid ester in amount to attain solution and to cause the esterification reaction to proceed with speed. The excess may extend up to 10, 20 or even 100 fold (upon a molar basis of the beta-keto ester) with respect to the total available hydroxyls in the polyester. Such excesses of beta-keto ester tend strongly to dilute and reduce the concentration of the evolved alcohol and thus favor the ester interchange reaction. Similar results can be obtained by removing the alcohol of evolution substantially as it is formed by application of a vacuum designed to pull off or distill the evolved alcohol at permissible temperatures. The reaction mixture can also be blown with an inert gas such as nitrogen, carbon dioxide, or combustion products such as may be obtained by the burning of butane or the like hydrocarbon, with air.

The temperature at which the ester interchange reaction is effected preferably is relatively mild. Optimum ranges seem to be about 100° C. or 20 or 30 degrees higher or lower. If low temperatures are employed it is usually desirable to apply sufficient vacuum to attain ready distillation of the evolved alcohol. Higher temperatures, e. g. 140 to 160° C. may sometimes be applied but the reaction mixture should then be watched carefully to avoid decomposition of the reactants such as the beta-keto ester of a lower alcohol and to obviate undue volatilization and loss of the latter component.

Inasmuch as alkyd bodies are usually relatively viscous or even solid bodies, it is often desirable to include in the reaction mixture, sufficient solvent or diluent thereof to attain a reasonable degree of fluidity which will permit admixture of the ester of a lower alcohol and a beta-keto acid into the polyester. The ester of a lower alcohol itself constitutes a very good solvent and inasmuch as it is often or even usually employed in considerable excess, it may be adequate to attain a reasonable degree of fluidity in the reaction mixture. However, diluents such as petroleum naphtha, xylene, toluene and various other solvents of alkyd resins or modified alkyd resins and the beta-keto ester of lower alcohols may be included. Sufficient total solvent is included in the reaction mixture to attain a desired degree of fluidity. At the conclusion of the reaction, any solvents remaining in the system as well as any other volatile constituents such as evolved lower alcohol, is evaporated off, preferably under vacuum, e. g. at a pressure (absolute) of 5 to 100 mm.

Preparation of a number of alkyds suitable for treatment with beta-keto esters of lower alcohols as illustrated in the subsequent examples is as follows:

Alkyd A

According to this example, an appropriate alkyd resin suitable for further treatment with beta-keto ester of lower alcohols was prepared. 1053 grams refined linseed oil, 210 grams glycerine, and 0.4 gram litharge catalyst were heated to 445° F. for one-half hour with agitation, at which point alcoholysis had taken place as indicated by complete solubility of a portion of the mixture in methyl alcohol. 893 grams phthalic anhydride, 260 grams glycerine, and solvent xylene were added and the temperature again brought to 440° F. It was held there for a total of 4 hours. During this heating the mixture was bubbled with inert gas to aid in the removal of water from esterification. The resulting resin was diluted with solvent naphtha to a solids content of 57.6%, having an acid value of 10.5 and a viscosity of M (Gardner-Holdt). This alkyd body was suitable for interaction by ester interchange with the lower esters of beta-keto acids as hereinafter described in the examples.

Alkyd B

An alkyd resin was prepared by reacting 276 grams (3 moles) glycerol, 408 grams (3 moles) of pentaerythritol sold under the trade name "Pentek," 2080 grams (8 moles) soya fatty acids and 830 grams (5.6 moles) phthalic anhydride. The reaction was effected by heating the mixture to esterification temperature under a blanket of inert gas and removing the water of evolution. The resultant alkyd body was thinned with a mixture of xylene and solvent naphtha. Viscosity tests were conducted upon this solution when a dilution of 63.8 per cent solids was attained. The properties of the material were as follows: Gardener viscosity B, Gardener color 6.5, acid value of solids 4.1, saponification value of solids 327. This alkyd body contained free hydroxyls and was adapted for ester interchange with lower esters of beta-keto acid such as methyl acetoacetate in accordance with the provisions of the examples in the present invention.

Alkyd C

An alkyd resin was prepared by heating 596 grams soya oil, 130 grams pentaerythritol, and 0.25 litharge catalyst at 445° F. for ¾ hours to complete alcoholysis. At this point 132 grams glycerine, 26 grams pentaerythritol, and 560 grams phthalic anhydride were added and some solvent xylene. Heating was continued at 415° F. for 3½ hours to remove water of esterification. This resin was thinned with solvent naphtha to a solids content of 50% and had a viscosity of U (Gardner-Holdt).

Alkyd D

In order to prepare an alkyd body containing excess hydroxyl groups and being adapted for reaction by ester interchange with a beta-keto ester, a mixture of 770 grams of glycerine, 990 grams cocoanut oil fatty acids and 1092 grams phthalic anhydride were esterified under conventional conditions, namely a temperature of 440° F. for 6¾ hours and under inert gas to provide a polyester or alkyd body of a viscosity of U at 50% solids and an acid value of 0.6. The product contained excess hydroxyls and was adapted for esterification by interchange with methyl acetoacetate as hereinafter described in Example IV.

Alkyd E

A further alkyd resin also containing free hydroxyls and being adapted for the ester interchange herein disclosed, was prepared by heating under appropriate conditions, namely under inert gas for 6 hours and to an ultimate temperature of 440° F., 1053 grams linseed oil, 427 grams glycerine and 893 grams of phthalic anhydride until a polyester of a Gardner viscosity of U at 53.3% solids was obtained. This is the alkyd body of Example V to follow.

Alkyd F

In this example, a mixture of equal moles of maleic anhydride and phthalic anhydride were heated with a slight excess of propylene glycol under a blanket of inert gas at a temperature of about 150° C. to provide a polyester appropriate for use in the present invention.

Alkyd G

In this example, a slight excess of propylene glycol was heated with maleic anhydride under suitable blanketing conditions until a polyester containing an excess of free hydroxyls was formed.

The following examples illustrate the application of the invention to effect ester interchange between alkyd resins such as those previously described as A to G inclusive, with esters of a beta-keto acid such as acetoacetic acid, and a lower alcohol such as methyl or ethyl alcohol.

EXAMPLE I

A mixture constituting 1000 grams of the alkyd body A containing 57.6% solids dissolved in solvent naphtha, was admixed with 500 milliliters of methylaceto acetate and heated on the steam bath for 18 hours. All of the solvent was then removed from the reaction mixture by distillation in vacuum and to the hot resin, 500 grams of solvent naphtha was added. The resultant solution had a Gardner viscosity of U to V at 50.4% solids. This material may be employed as a coating medium and for other applications to which alkyd resins are usually applied. The resin is also adapted for further reactions and modifications as hereinafter described.

EXAMPLE II

The alkyd body B in a proportion of 1000 grams of 63.8% solution, was admixed with 1000 grams of methyl acetoacetate and the mixture was heated on a steam bath under a pressure of 140 mm. (absolute) for 15 hours. The resultant resin was completely stripped under vacuum. The product, a resinous body, was obtained in a yield of 671 grams. It had a saponification value of 364. This resin may be dissolved in diluents such as naphtha or toluene and employed for coating purposes. It may also be subjected to further reactions as hereinafter described.

EXAMPLE III

Alkyd resin C was made up in solvent naphtha to a concentration of 50% solids. This mixture was then reacted with methyl acetoacetate on a steam bath and at 140 mm. (absolute) for 15 hours in the manner described in Example II to provide a resinous body. Excess methyl acetoacetate and other volatiles were stripped under vacuum.

EXAMPLE IV

The alkyd body D is made up with methyl acetoacetate and reaction is effected upon a steam bath at atmospheric pressure to provide esters of acetoacetic acid and the alkyd body. Excess methyl acetoacetate and other volatile matter are vacuum distilled.

EXAMPLE V

The alkyd body E was admixed with methyl acetoacetate and treated as in Example IV to provide a body soluble in toluene and solvent naphtha and being adapted for use as a coating medium.

EXAMPLE VI

Admix the ethylenically unsaturated alkyd body F with methyl acetoacetate and an appropriate solvent such as solvent naphtha. Heat the mixture upon a steam bath and preferably under vacuum in order to effect ester interchange between the free hydroxyls of the alkyd body and the acetoacetic acid ester of a lower alcohol.

EXAMPLE VII

Admix the alkyd body G with an excess of methyl acetoacetate and heat the reaction mixture on a steam bath under a pressure of 140 mm. (absolute) until esterification is essentially complete. Distill off any unreacted methyl acetoacetate under vacuum to provide a modified alkyd body.

MODIFICATIONS OF ACETOACETIC ACID ESTERS OF ALKYD RESINS

It has already been indicated that the modified resins obtained from ester interchange reaction between the hydroxylated alkyd resin and a beta-keto ester of a lower alcohol, contain active groups which are susceptible of further reaction to form modifications of the esters of the alkyd bodies and the beta-keto acids.

For example, in the group $$-\underset{O}{\overset{\parallel}{C}}-\underset{R^2}{\overset{H}{\underset{|}{C}}}-\underset{O}{\overset{\parallel}{C}}-O-$$

hydrogen on the alpha-carbon atom is reactive and can undergo reaction with aldehydes and ketones as hereinafter more fully explained.

The ketonic carbonyl oxygen is reactive and can be replaced by $$=N-OH$$
$$=N-NHR$$
$$-NH_2$$

and $$-N\begin{matrix}R^1\\ \diagdown \\ R^2\end{matrix}$$

A third type of reactivity involves the enolic hydroxyl of the tautomeric $$-\underset{\phantom{O}}{\overset{OH}{\underset{|}{C}}}=\overset{\phantom{|}}{\underset{\phantom{|}}{C}}-$$

form of the carbonyl. A number of these reactions have been referred to in the foregoing application, Serial No. 219,900.

Reactions involving the activated hydrogen atoms on the carbonyl groups between the carboxyls is typified or represented by the reactions obtained with aldehydes such as formaldehyde, acetaldehyde, propionaldehyde, crotonaldehyde, furfural, and such like aldehydes, especially those containing 6 carbon atoms or less. These reactions are of the Knoevenagel type. They may be represented by the type formula:

$$RO\cdot\overset{O}{\overset{\parallel}{C}}-\underset{H}{\overset{H}{\underset{|}{C}}}-\overset{O}{\overset{\parallel}{C}}-CH_3 + R^1CHO \longrightarrow RO\cdot\overset{O}{\overset{\parallel}{C}}\cdot\underset{R^1\cdot CH}{\overset{\phantom{O}}{C}}\cdot\overset{O}{\overset{\parallel}{C}}\cdot CH_3 + H_2O$$

In the equation R is the alkyd resin body such as any one of those represented by alkyds A to G hereinbefore discussed. $R^1$ is a hydrogen or a hydrocarbon group or radical of an aldehyde, such as H in formaldehyde, $-CH_3$ in acetaldehyde, etc. This type of reaction is usually catalyzed by a small amount of an organic base such as piperidine, diethyl amine or the like.

It will be observed that in reactions of this type the new or modified alkyd body containing the acetoacetic acid radical contains a methylene group in conjugate relation to the oxygens of a carboxyl group. Such methylene groups are recognized to be of high functionality. For example, they are capable of reaction with other molecules of beta-keto acid modified polyesters to provide carbon bridging between a pair of such molecules. The reaction of this type is represented by the following formula:

$$RO\cdot\overset{O}{\overset{\parallel}{C}}\cdot\underset{R^1CH}{\overset{\phantom{O}}{C}}\cdot\overset{O}{\overset{\parallel}{C}}\cdot CH_3 + RO\cdot\overset{O}{\overset{\parallel}{C}}\cdot\underset{H}{\overset{H}{\underset{|}{C}}}\cdot\overset{O}{\overset{\parallel}{C}}\cdot CH_3 \longrightarrow RO\cdot\overset{O}{\overset{\parallel}{C}}\cdot\underset{\underset{RO\cdot\overset{O}{\overset{\parallel}{C}}\cdot\underset{O}{\overset{H}{\underset{\parallel}{C}}}\cdot CH_3}{R^1\cdot CH}}{\overset{H}{\underset{|}{C}}}\cdot\overset{O}{\overset{\parallel}{C}}\cdot CH_3$$

In this latter formula, the groups R constitute polyester radicals and $R^1$ is hydrogen or an alkyl or an aryl group.

It will be recognized that the beta-keto ester modified alkyd bodies may similarly be condensed with ketones such as acetone, methyl ethyl ketone and the like, in accordance with the following equation:

$$RO\cdot\overset{O}{\overset{\parallel}{C}}\cdot\underset{H}{\overset{H}{\underset{|}{C}}}\cdot\overset{O}{\overset{\parallel}{C}}\cdot CH_3 + \underset{R^1}{\overset{R^1}{\underset{|}{C}}}=O \longrightarrow RO\cdot\overset{O}{\overset{\parallel}{C}}\cdot\underset{\underset{R^1}{\overset{\diagup}{\underset{\diagdown}{C}}\atop R^1}}{\overset{\phantom{O}}{C}}\cdot\overset{O}{\overset{\parallel}{C}}\cdot CH_3 + H_2O$$

In this equation, $R^1$ is alkyl or aryl and cannot be hydrogen.

To effect modification of the beta-keto acid esters, formaldehyde or the so-called "latent" formaldehydes, e. g. paraformaldehyde, hexamethylene tetramine, and the like may be employed. As stated, other suitable aldehydes such as acetaldehyde, propionaldehyde, and benzaldehyde may be employed. Likewise, ethylenically unsaturated aldehydes such as acrolein, crotonaldehyde and furfural may be used in lieu of formaldehyde. These latter introduce further unsaturation into the alkyd molecule and thereby increase the functionality thereof.

The following examples illustrate the modification of acetoacetic acid modified alkyd esters prepared by such methods as disclosed in Examples I, II, III, IV, V, etc. with carbonyl compounds such as formaldehyde or "latent" formaldehyde.

EXAMPLE VIII

According to this example, a mixture of 500 grams of the resin of Example I, was admixed with 5 grams of paraformaldehyde, 1 milliliter of pyridine, 1 drop of piperidine and 100 milliliters of solvent naphtha. The mixture was heated on the steam bath with agitation for 3 hours. The reaction mixture was then heated under vacuum until water of reaction had distilled azeotropically. The total distillate had a volume of 100 milliliters and contained some water, indicating reaction had taken place. The resin obtained had a viscosity (Gardner) greater than Z6 at 55.8% by weight of solids.

The resin molecule had become cross-linked. It exhibited good drying properties and improved alkali resistance.

EXAMPLE IX

In this example, 500 grams of the alkyd resin prepared as described in Example II and being modified with acetoacetic acid, was dissolved in 640 grams of xylene, and 9 grams of paraformaldehyde. One milliliter of pyridine and 3 drops of piperidine were added to the mixture and the latter was then heated at 115° C. under inert gas for 4 hours, during which time a total of 125 cc. of solvent and water had distilled. The resultant resin solution had an acid value of 6.7 and was of a solids content of 49.9%. The Gardner viscosity thereof was A. It showed better alkali and water resistance than a standard composition comprising an alkyd prepared by cooking 2080 grams (8 moles) soya fatty acids, 740 grams (5 moles) phthalic anhydride, 246 grams (2.67 moles) glycerine and 340 grams (2.5 moles) Pentek (pentaerythritol) to an acid value of 18 and a Gardner viscosity of Z at 95% solids.

EXAMPLE X

In this example, the acetoacetic acid ester of the alkyd resin as prepared in Example III was compounded with paraformaldehyde, pyridine and piperidine and heated as in Example IX. The resultant resin had a viscosity of Z in a solution in toluene containing 50% by weight of solids and dried faster and showed better water resistance than the unmodified resin.

EXAMPLE XI

In this example, the derivative of methyl acetoacetate and the alkyd resin prepared in Example IV except for the omission of vacuum during the ester interchange reaction was admixed with paraformaldehyde and was heated upon a steam bath until a resin, which in a concentration of 52% by weight of solids in aromatic naphtha had a viscosity greater than Z6 on the Gardner scale. The product dried substantially better than the corresponding alkyd resin which had not been modified with methyl acetoacetate and formaldehyde and which was of the composition:

| | Grams |
|---|---|
| Cocoanut oil acids | 990 |
| Glycerine | 695 |
| Phthalic anhydride | 1092 |

Viscosity Z at 50% by weight solids.

EXAMPLE XII

In this example, the resin body obtained in Example V was employed as the beta-keto acid modified alkyd body. The resin was cooled to 250° F. and 3 grams of paraformaldehyde were added. The reaction mixture was held at 280° F. for 30 minutes. The viscosity of the product rose to a value of Z2 at which point the reaction was discontinued.

It is to be understood that the invention as herein disclosed includes the substitution of the other aldehydes such as acetaldehyde, propionaldehyde, furfural, crotonaldehyde, acrolein and the like for formaldehyde or "latent" formaldehyde compounds in the several Examples VIII through XII, as herein discussed. In such substitutions, the carbonyl compounds will be employed in the same molar equivalency as the formaldehyde in the prior examples.

In effecting the reactions of ester interchange between the hydroxy alkyd resin and the acetoacetic acid ester of a lower alcohol and likewise in the subsequent Knoevenagel condensation of the resultant ester product with aldehydes, ketones and the like, the time of reaction may vary, for example from approximately 10 minutes to 24 hours. The pressure of reaction may be atmospheric or negative (vacuum) as may be desired. The temperature of the reaction preferably is within a range of 60 to 170° C. or thereabouts.

The invention likewise includes the replacement of active hydrogen of the alpha carbon of the beta-keto acid esters of alkyd bodies with benzylic type halides and alcohols such as triphenyl methyl chloride and triphenyl carbinol. These reactions proceed in accordance with the partial equation:

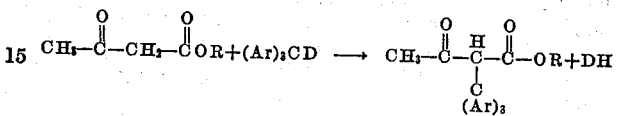

where D is chlorine or —OH. In the equation R is again the residue of an alkyd resin prepared in accordance with the provisions of the present invention. Ar represents phenyl or substituted phenyl.

The active hydrogen of the alpha carbon atom beta-keto acid esters of alkyds in A to G inclusive, may also undergo so-called Michael type reactions with alpha-beta unsaturated carbonyl compounds as represented by the equation:

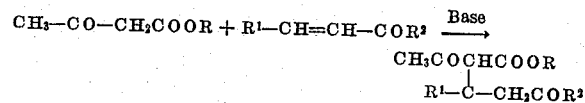

In the equation, the group R is the residue of an alkyd body prepared as for example, in the present examples. Groups $R^1$ and $R^2$ may be hydrogen or hydrocarbon, e. g. ethyl, methyl or the like.

The reaction of the beta-keto esters of alkyd resins with diazonium salts such as benzene diazonium chloride to yield compounds containing a dye structure is likewise a part of the present invention. Such reaction may be represented by the equation:

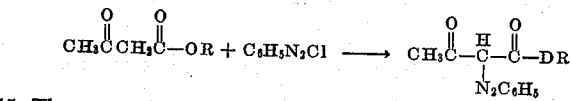

The group R, again, is the alkyd body or residue prepared as for example, as disclosed in Examples A–G inclusive.

REACTIONS INVOLVING THE BETA CARBONYL OXYGEN

It is to be understood that the beta-keto acid esters such as acetoacetic acid esters of the alkyd resins as herein disclosed, may be reacted with other compounds. For example, they may be reacted with ammonia or with amines to form beta-amino crotonic esters of said alkyd bodies. In these, the beta-keto oxygen is replaced by $NH_2$ or its equivalent amine. This type of reaction can be represented by the following equation:

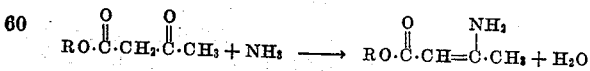

It is to be understood that in the equation, the group R constitutes an alkyd resin such as one of those of the group A to G inclusive. It is usually preferable, though not indispensable, to effect the reaction between the beta-keto ester of the alkyd resin and the ammonia or the amino body in the presence of a small amount of a suitable catalyst, such as ammonium acetate. The reaction can be effected in the presence of or in the absence of, suitable solvents of the reaction mixture. Since the alkyd resins are relatively viscous materials, or even solids, the use of a solvent is often to be preferred. The solvent may be naphtha, xylene, toluene, or even a glyceride oil or any of the other conventional solvents of alkyd resins. Only sufficient solvent to produce adequate fluidity of the reaction mixture need be employed. The reaction may be effected substantially at room temperature or at elevated temperatures, for example, upon a steam bath.

The following illustrate the treatment of the acetoacetic acid esters of alkyds with ammonia. Ammonium acetate can be employed in small catalytic amounts or it can be employed as the sole source of ammonia in the reaction.

EXAMPLE XII

In this example, an alkyd resin which has been modified with acetoacetic acid as disclosed in Example I is employed as a starting material. The resin dissolved in naphtha or the like, is treated with ammonia gas, preferably in the presence of (though not necessarily) a small amount of ammonium acetate. Ammonia preferably as a gas is passed into the acetoacetic acid modified alkyd body for a period of about 2 hours. In the foregoing example, it is to be understood that ammonia gas could be added for a longer or shorter period. However, 2 hours is deemed to be adequate for most purposes. In this manner, it is possible to form the beta-amino crotonate of the alkyd body.

It is to be understood that other basic ammonia compounds such as ethyl amine, diethyl amine, aniline and many others may be substituted for ammonia in the reaction. The incorporation of ammonia or an amino group in the beta-keto ester of an alkyd body tends strongly to increase the water solubility of the product. This is a property which is often desirable in the preparation of water emulsion coating compositions.

Further reactions of the esters of beta-keto acids and alkyd resins containing residual hydroxyls involve the enolic hydroxyl group of a tautometer of the beta-keto ester. Typical examples of such reactions involve the halogenization of the esters, for example, with bromine or chlorine. This type of reaction can be represented by the equation:

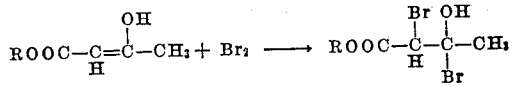

In the equation, the group R is an alkyd resin residue prepared as previously described.

ADVANTAGES ATTENDING THE APPLICATION OF THE INVENTION

Numerous advantages are observable in the practice of the invention. A number of these are herein listed. However, it is to be understood that all of the advantages do not necessarily occur simultaneously in the same composition. It may well be that in certain instances but a single advantage will be observed. In other instances several of the advantages may occur simultaneously.

*Advantages*

1. The compositions of resins as herein disclosed in many instances are capable of air curing or drying by baking to provide hard, durable bodies.

2. It is possible to prepare a modified polyester of high viscosity wherein a substantial increase in molecular complexity is achieved at a point where further esterification linkages are difficult to complete and without the application of addendum reactions involving the use of unsaturation in the alkyd bodies.

3. It is possible by application of the invention to obtain polyester compositions which are free or nearly free of hydroxyl groups.

4. It is possible to prepare polymers containing crosslinkage between contiguous polyester molecules through carbon bridges.

5. It is possible to improve the water and alkali resistance of the alkyd resin films by elimination of the free hydroxyls of the alkyd resins.

6. By the introduction of ammonia or amine groups, it is possible to improve the emulsification characteristics and provide alkyd resins which are especially adapted for use in the preparation of emulsion coating compositions.

The forms of the invention herein disclosed are to be regarded as being by way of example. It will be apparent to those skilled in the art that numerous modifications may be made therein without departure from the spirit of the invention or the scope of the appended claims.

We claim:

1. A modified alkyd resin obtained by interesterification of an alkyd body containing free hydroxyls and an ester of a beta-keto acid and a monohydric alcohol containing 1 to 4 carbon atoms.

2. A method of modifying an alkyd resin containing free hydroxyls which comprises the steps of reacting said alkyd resin with an ester of a beta-keto acid and a monohydric alcohol containing 1 to 4 carbon atoms, at a temperature in the range of about 70° C. to 160° C., whereby to effect ester interchange between the alkyd resin and a beta-keto ester.

3. A method of forming beta-keto esters of alkyd resins containing free hydroxyls which comprises the steps of effecting ester interchange between said alkyd resin, and an ester of acetoacetic acid and a lower alcohol containing a single hydroxyl and 1 to 4 carbon atoms, the reaction being effected at a temperature in the range of about 70° C. to 160° C.

4. A method of forming beta-keto esters of alkyd resins containing free hydroxyl groups comprising the steps of heating under vacuum a mixture of said resin and an ester of a beta-keto acid and a lower alcohol containing a single hydroxyl and 1 to 4 carbon atoms, the reaction being effected at a temperature in the range of about 70° C. to 160° C.

5. The product of ester interchange between (A) a phthalic glyceride containing free hydroxyls and (B) an ester of a monohydric alkyl alcohol containing one to four carbon atoms and a beta-keto monocarboxylic acid.

6. A method of forming a modified alkyd resin which comprises treating under vacuum and at a temperature below 160° C. a mixture of (A) a phthalic glyceride containing free hydroxyls and (B) an ester of a beta-keto monocarboxylic acid and a monohydric alcohol containing one to four carbon atoms whereby to effect ester interchange between the phthalic glyceride and the beta-keto ester of a lower alcohol.

7. A method of modifying an alkyd resin containing free hydroxyls, which comprises admixing the alkyd resin with an ester of a beta-keto acid and aliphatic alcohol containing one to four carbon atoms, said ester being in molar excess over the available hydroxyls and heating the mixture to effect ester interchange between the resin and the ester of the beta-keto acid.

8. A method of modifying an alkyd resin containing free hydroxyls which comprises reacting the same with a beta-keto acid ester of a lower monohydric alcohol containing 1 to 4 carbon atoms at a temperature below that of decomposition of the beta-keto acid ester whereby to evolve lower alcohol and to form said ester and removing the evolved alcohol.

9. A method as defined in claim 8 in which the beta-keto acid is acetoacetic acid.

10. A method as defined in claim 8 in which the reaction temperature is at about 100° C.

References Cited in the file of this patent

UNITED STATES PATENTS

| 2,059,850 | Coolidge | Nov. 3, 1936 |
| 2,325,376 | D'Alelio | July 27, 1943 |
| 2,330,337 | Cupery | Sept. 28, 1943 |

FOREIGN PATENTS

| 465,363 | Canada | May 23, 1950 |